United States Patent

Karabed et al.

[11] Patent Number: 5,809,080
[45] Date of Patent: Sep. 15, 1998

[54] SYSTEM AND METHOD FOR CODING PARTIAL RESPONSE CHANNELS WITH NOISE PREDICTIVE VITERBI DETECTORS

[75] Inventors: Razmik Karabed, San Jose; Nersi Nazari, Cupertino, both of Calif.

[73] Assignee: Mitel Semiconductor Americas Inc., San Jose, Calif.

[21] Appl. No.: 541,675

[22] Filed: Oct. 10, 1995

[51] Int. Cl.[6] ............................................. H04L 5/12
[52] U.S. Cl. ....................... 375/263; 371/37.03; 375/341
[58] Field of Search .......................... 341/50, 52, 51, 341/81, 94, 95, 106; 360/40, 39, 68, 371; 371/30, 43, 37.03; 375/263, 265, 290, 341, 229, 232; 364/724.2, 724.19

[56] References Cited

U.S. PATENT DOCUMENTS

| | | | |
|---|---|---|---|
| 4,135,057 | 1/1979 | Bayless, Sr. et al. | 375/280 |
| 4,581,601 | 4/1986 | Calderbank et al. | 340/347 |
| 4,888,779 | 12/1989 | Karabed et al. | 371/43 |
| 5,095,484 | 3/1992 | Karabed et al. | 371/30 |
| 5,388,124 | 2/1995 | Laroia et al. | 375/17 |
| 5,548,600 | 8/1996 | Fredrickson et al. | 371/43 |

OTHER PUBLICATIONS

Results of Lexis data search on Aug. 22, 1995.

*Primary Examiner*—Stephen Chin
*Assistant Examiner*—Joseph Roundtree
*Attorney, Agent, or Firm*—Fenwick & West LLP

[57] ABSTRACT

A system and method includes an encoder and noise predictive Viterbi detector tuned such that error events with small values of the unique distance metrics are eliminated so that the error rate is enhanced. The system includes an encoder, a modulator, a PR channel and a detector. An input signal is input to the encoder. The encoder preferably encodes the input string with an even weight code to generate a code string thereby providing high code rates that are easy to implement. The output of the encoder is coupled to the input of the PR channel. The PR channel preferably comprises a filter and a noise source coupled to form a channel, a sampler, a low pass filter and an equalizer. The output of the channel is input to the low pass filter. The output of the low pass filter is coupled by the sampler to the input of the equalizer. Finally, the output of the equalizer is coupled to the input of the detector. The detector is a noise predictive Viterbi detector (NPV) and like the encoder is made such that error events with small values of d' are eliminated. In particular, the NPV detector includes a combined code parity and partial response trellis which advantageously reduces the hardware required for the system.

21 Claims, 7 Drawing Sheets

SYSTEM AND METHOD FOR CODING PARTIAL RESPONSE CHANNELS WITH NOISE PREDICTIVE VITERBI DETECTORS

BACKGROUND OF THE INVENTION

1. Field of the Invention

The present invention relates generally to methods for transmission of binary digital data over partial response maximum likelihood channels. More particularly, the present invention relates to using a novel encoding scheme and Noise Predictive Viterbi (NPV) detection to achieve coding gain at high rates with simple hardware requirements.

2. Description of the Related Art

The use of partial response maximum likelihood (PRML) channels is well known in the art as a method for transmitting data. Further, the use of precoding with error correction on PRML channels is also known in the art. One such method is disclosed by J. K. Wolf and G. Ungerboeck, in "Trellis Coding For Partial-Response Channels," *IEEE Trans. Comm.*, August 1986, pp. 765–773. However, the problem with this method of prior art is that the preceding effectively eliminates the channel memory and it imposes unusual complexity on the detector.

There have been attempts to reduce the complexity due to preceding in the prior art including other methods for coding PRML channels. For example, R. Karabed and P. Siegel disclose one such method in U.S. Pat. No. 4,888,775 entitled "Trellis Codes For Partial-Response Channels," issued Dec. 19, 1989. Another coding approach to resolve this problem is described by R. Karabed and P. Siegel in U.S. Pat. No. 4,888,779 entitled "Matched Spectral Null Codes for Partial Response Channels," issued Dec. 19, 1989, which is incorporated herein by reference. Both these references describe other methods of coding PRML channels that are less complex than that disclosed by Wolf and Ungerboeck. In the latter reference, Karabed and Siegel disclose the application of trellis codes with K-th order spectral zeros to enhance coding gain on partial response channels. The codes obtained using the methods disclosed by Karabed and Siegel have less hardware complexities than the codes of Wolf and Ungerboeck since they do not eliminate channel memory by precoding. Nonetheless, even these methods provide less than completely optimum coding gain for their complexity. Thus, there continues to be a need for methods of transmitting binary data that require a minimum amount of hardware and also provide a good coding gain.

One particular problem with the above methods for coding PRML channels is that the noise samples reaching the detector are assumed to be Gaussian and independent. This enables the use of a Viterbi detector to perform the maximum likelihood sequence estimation. However, in most communication systems, noise samples are not Gaussian or independent. For instance, in magnetic recording, noise samples at the input to the detector are correlated since disk noise is intrinsically colored, and the channel equalizer generates its own correlation on the noise samples. Therefore, the performance of these prior art methods is less than optimum because the maximum likelihood sequence estimator, in general, is very complex to implement when noise becomes colored or non-Gaussian since Viterbi detectors fail to perform as a maximum likelihood sequence estimator under these conditions.

Another detector known in the art is noise predictive Viterbi detectors. For example, Bergmans, et al in "On The Use Of Decision Feedback For Simplifying The Viterbi Detector," *Philips J. Res.* pp.399–428, 1987; and Chevillat, et al in "Noise Predictive Partial Response Equalizers And Applications," *ICC '92*; disclose the use of noise predictive Viterbi detectors, and performance better than traditional Viterbi detectors in the presence of colored noise. Despite such improved performance, the use of noise predictive Viterbi detectors alone continues to limit the increases in coding gain.

Thus, there is a need for a system and method that provide high rate codes with simple hardware requirements which further improves the performance of Noise Predictive Viterbi (NPV) detectors.

SUMMARY OF THE INVENTION

The present invention is a system and method for coding input strings at a high rate to improve the performance of partial response channels with noise predictive Viterbi detectors. The present invention advantageously provides a unique distance metric for measuring error, and then tunes the encoder and noise predictive Viterbi detector such that error events with small values of the unique distance metric are eliminated. The system of the present invention preferably comprises an encoder, a modulator, a PR channel and a detector. An input signal is input to the encoder. The encoder preferably encodes the input string by an even weight code to generate a code string. The output of the encoder is coupled to the input of the modulator to supply the code string to the modulator. The output of the modulator is coupled to the input of the PR channel. The PR channel preferably comprises a filter and a noise source coupled to form a channel, a sampler, a low pass filter and an equalizer. The output of the channel is input to the low pass filter. The output of the low pass filter is coupled by the sampler to the input of the equalizer. Finally, the output of the equalizer is coupled to the input of the detector. The detector is a Noise Predictive Viterbi (NPV) detector and like the encoder is made such that error events with Hamming distance less than two are eliminated. In particular, the NPV detector includes a combined code parity and partial response trellis which advantageously minimizes the hardware required for a system with significantly increased coding gain.

The method of the present invention preferably comprises the steps of: 1) encoding of an input string by de-interleaving the input string into one or more strings, coding each of the de-interleaved input strings with an even weight code, and interleaving of the coded de-interleaved strings to produce a code sequence; 2) transmitting the code sequence through the channel to generate a channel output sequence; 3) filtering the channel output sequence with a low pass filter; 4) equalizing the filtered channel output sequence to produce an equalized output sequence; 5) producing a NPV detector output sequence by applying the equalized output sequence to a NPV detector utilizing a combined trellis of the encoder parity trellis and the partial response trellis; and 6) applying the "inverse" of the partial response filter to the detector output sequence, and then decoding the resulting sequence.

BRIEF DESCRIPTION OF THE DRAWINGS

The present invention has other advantages and features which will be more readily apparent from the following detailed description of the invention and the appended claims, when taken in conjunction with the accompanying drawings, in which:

DETAILED DESCRIPTION OF THE PREFERRED EMBODIMENT

While the present invention will now be described with reference to a communication system encountered in magnetic recording practice, those skilled in the art will realize that the present invention can be incorporated into any one of a variety of systems for transmitting binary data.

Figure 1:
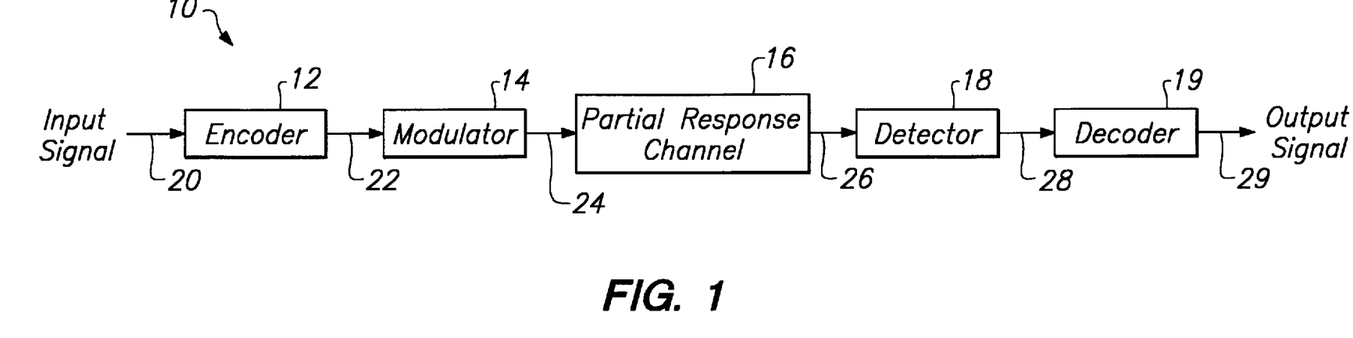
FIG. 1 is a block diagram of a preferred embodiment of a communication system for coding partial response channels with a Noise Predictive Viterbi detector constructed according to the present invention.
Figure 2:
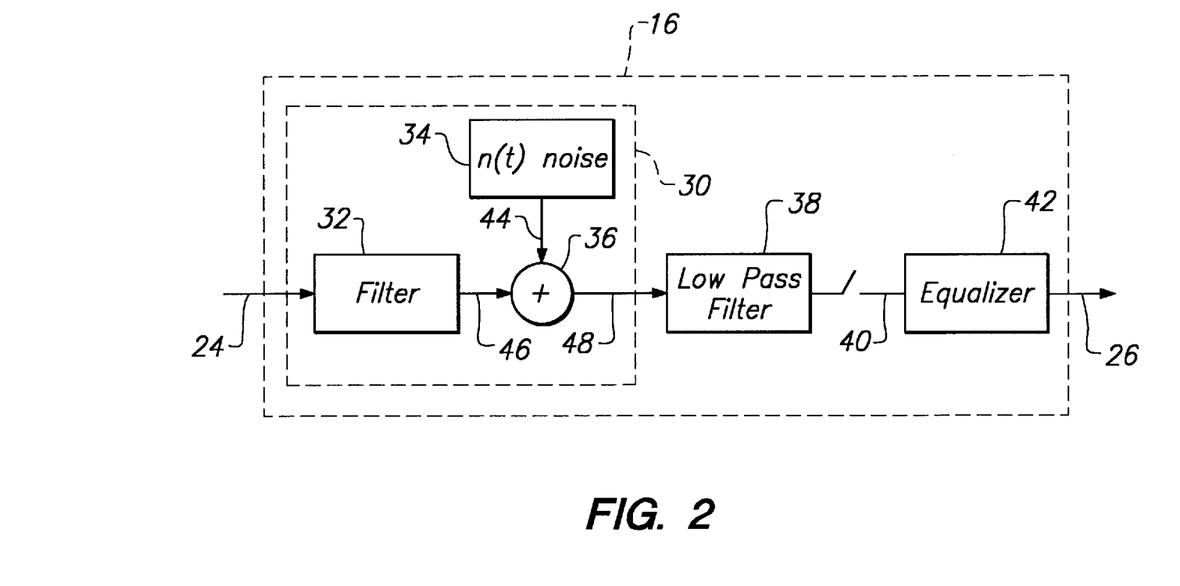
FIG. 2 is a block diagram of a preferred embodiment of a partial response channel according to the present invention.

Referring now to FIG. 1, a preferred embodiment of a communication system 10 constructed in accordance with the present invention is shown. The preferred embodiment of the system 10 comprises an encoder 12, a modulator 14, a partial response (PR) channel 16, a detector 18, and a decoder 19. The PR channel 16 preferably further comprises a low pass filter 38, a sampler 40, an equalizer 42, and a channel 30 formed of a filter 32, a noise source 34 and an adder 36, as shown in FIG. 2. The present invention matches the encoding provided by the encoder 12 with the detector properties of the detector 18 to improve the performance of the partial response channel in the presence of colored noise. In particular, the present invention encodes the input data using an even weight code, and uses a combined trellis of encoder parity and partial response in a noise predictive Viterbi detector.

As shown in FIG. 1, an input signal on a line 20 is transmitted to an input of the encoder 12. The input signal or data is preferably in the form of a binary symbol string, $b=(b_0,b_1,b_2,\ldots)$. The encoder 12 produces and outputs a binary code sequence, $x=(x_0,x_1,x_2,\ldots)$, from the input signal. The code sequence is preferably produced by: (1) de-interleaving the input signal into p, $p \geq 1$, strings; (2) coding each de-interleaved string with a weight (preferably even) code of block length q; and (3) interleaving the coded strings to form the code sequence. The preferred embodiments for encoding the input signal are described below with particularity, however, for ease of understanding the remaining components of the system 10 will first be described. The output of the encoder 12 is coupled to line 22 to provide the code sequence on line 22.

The modulator 14 has an input and an output. The input of the modulator 14 is coupled to line 22 to receive the code sequence. The modulator 14 generates a waveform, I(t), at its output based on the code sequence, $x=(x_0,x_1,x_2,\ldots)$, according to the equation:

$$I(t) = \sum_i x_i p(t - iT),$$

where T is a fixed time, and $$p(t) = \begin{cases} 1 & 0 \leq t \leq T, \\ 0 & \text{otherwise.} \end{cases}$$

The waveform I(t) is output by the modulator on line 24.

Referring now to FIG. 2, a preferred embodiment for the PR channel 16 is shown. The channel 30 is comprised of the filter 32, the noise source 34, and the adder 36. The filter 32 has an input and an output. The input of the filter 32 is coupled to line 24 to receive the waveform from the modulator 14. The filter 32 is preferably a Lorentzian filter. The filter's response to an isolated, negative to positive going transition, without loss of generality, is preferably:

$$h(t) = \frac{1}{1 + \left(\frac{2t}{PW_{50}}\right)^2},$$

and its response to an isolated, positive to negative going transition is $-h(t)$, where $PW_{50}$ is a parameter that is set equal to about 2.5 T in the preferred embodiments. The output of the filter 32 on line 46 is coupled to a first input of the adder 36. A second input of the adder 36 is coupled to line 44 to receive a noise signal, n(t), from the noise source 34. The noise source 34 preferably produces a noise signal, n(t), that is output on line 44. The noise signal, n(t), is preferably white and Gaussian with power spectral density $\sigma^2$. The adder 36 adds the noise signal, n(t), and the filter 32 output to produce a channel output sequence on line 48.

The PR channel 16 also includes the low pass filter 38, the sampler 40 and the equalizer 42 coupled in a serial configuration. The low pass filter 38 has an input and an output, and the input of the low pass filter 38 is coupled to line 48 to receive the channel output sequence. The low pass filter 38 preferably has a bandwidth of ½ T. The output of the low pass filter 38 is coupled to the input of the sampler 40. The sampler 40 preferably samples the output of the low pass filter 38 every T seconds to produce a signal, $z'=z+\hat{n}$, where $z=(z_0,z_1,z_2,\ldots)$ and relates back to I(t), and $\hat{n}$ relates to n(t). The output of sampler 40 is coupled to an input of equalizer 42. The equalizer 42 is preferably an FIR filter having taps $[g_0,g_1,\ldots,g_M]$. Therefore, equalizer 42 receives as an input signal, $z'=(z'_0,z'_1,z'_2,\ldots)$, from the sampler 40 and outputs the equalized output sequence signal, $y=(y_0,y_1,y_2,\ldots)$. The equalizer 42 is preferably configured such that:

$$y_k = \sum_{j=0}^{M} g_j z'_{k-j} \text{ for } k \geq M$$

for each portion of the equalized output sequence signal. The equalized output sequence signal is provided on line 26 from the output of the equalizer 42. While the PR channel 16 has been described above as including the channel 30, the low pass filter 38, and the equalizer 42, those skilled in the art will realize that the partial response channel 16 could also be a channel with a partial response filter.

Figure 3:
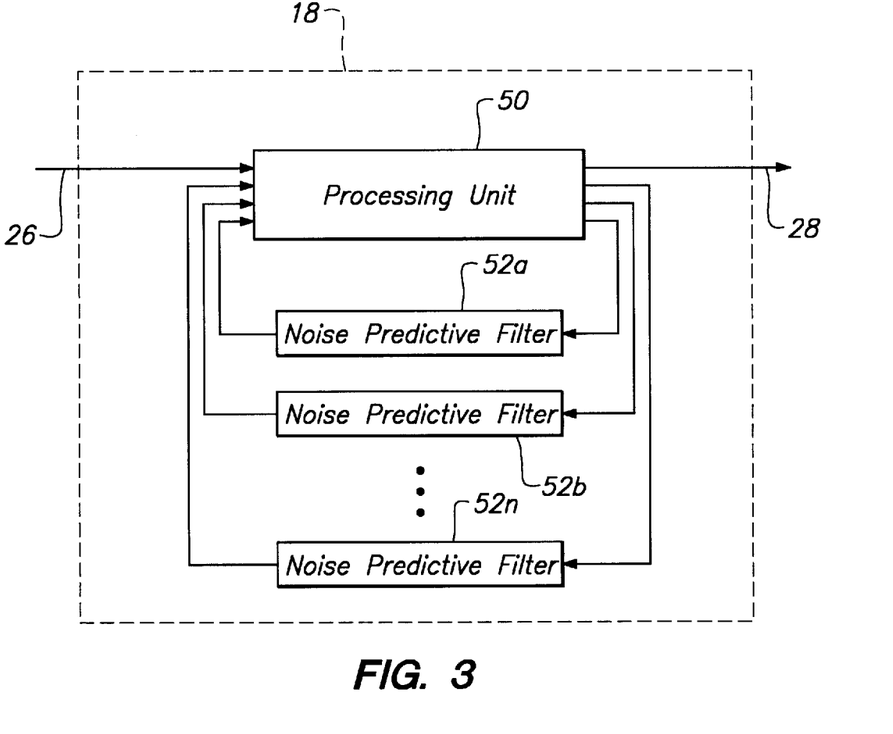
FIG. 3 is a block diagram of a preferred embodiment of a Noise Predictive Viterbi detector constructed according to the present invention.

Finally, the system 10 includes the detector 18 having an input and an output. The detector 18 will first be described here in general terms with more specific embodiments for the detector 18 being detailed below. The input of the detector 18 is coupled to line 26 to receive the equalized output sequence signal, $y=(y_0,y_1,y_2,\ldots)$. The detector 18 is preferably a Noise Predictive Viterbi (NPV) detector and generates a detector output sequence, $\hat{y}=(\hat{y}_0,\hat{y}_1,\hat{y}_2,\ldots)$ from the equalized output sequence signal. The detector 18 includes a noise predictive digital filter having taps $\alpha_0, \alpha_1, \ldots, \alpha_L$, and a labeled trellis H having J states that is the combined trellis of encoder parity and partial response trellis. In the preferred embodiment as shown in FIG. 3, the detector 18 comprises a processing unit 50 and a plurality of noise predictive filters 52a, 52b . . . 52n, preferably one noise predictive filter 52a, 52b . . . 52n, for each of the trellis states. Alternatively, a single filter can be used in place of the plurality of noise predictive filters 52a, 52b . . . 52n and shared among the states if computational speed is not an issue. The processing unit 50 preferably has a plurality of inputs and outputs, and has at least one input and one output coupled to each of the noise predictive filters 52a, 52b . . . 52n. The processing unit 50 preferably stores and updates the state metrics, state signal survivors, and noise survivors based on the trellis and the output of the noise filters 52a, 52b . . . 52n, as will be described in more detail below. In particular, the detector 18 preferably has:

(1) a metric $m_s(k)$, a signal survivor sequence $ss_s(k)$, and a noise survivor sequence $ns_s(k)$ for each state s and each time k;

(2) a plurality of rules for updating the metrics, signal survivor sequences, and the noise survivor sequences; and (3) an initial state, s*;

such that given a state s and a time k, the survivor sequence $ss_s(k)$ is a label sequence in the trellis H starting from s* at time zero and ending on s at time k. The present invention only saves the last t labels of each survivor sequence, and t is referred to as the truncation depth of the Viterbi detector.

A preferred set of rules for updating the detector 18 assumes: 1) the sequence $ns_s(k)=(n_s(1), n_s(2), \ldots, n_s(L))$ is the last L noise estimates for state s; 2) $s_1,s_2 \ldots s_q$ are the predecessor states to the state s, 3) $h_i$ is the label on the edge from $s_i$ to s; and 4) $r_k$ is the current value of the received sequence. The first updating rule in the preferred set provides that a metric, $m_s(k)$, is updated as $$m_s(k)=m_i\text{in}\{m_{s_i}(k-1)+[\alpha_0(r_k-h_i)+\alpha_1 n_{s_i}(1)+\alpha_2 n_{s_i}(2)+ \ldots +\alpha_{L-1}n_{s_i}(L-1)+\alpha_L n_{s_i}(L)]^2\}.$$

The second updating rule in the preferred set provides that if the jth state, $s_j$, produces the minimum value of $m_s(k)$, then the signal survivor sequence $ss_s(k)$ and the noise survivor sequence $ns_s(k)$ are updated by setting $ss_s(k)=(ss_{sj}(k-1),h_j)$, and $ns_s(k)=((r_k-h_j),n_{sj}(1),n_{sj}(2), \ldots, n_{sj}(L-1))$.

While the invention relies heavily on the characteristics of the noise in the channel 30, the invention is still applicable to the cases of non-white channel noise, and even to more general channels having a non-additive noise component. The channel noise correlation only effects the noise predictive filter taps. One skilled in the art will understand that a new set of taps taking into account the channel noise correlation can be readily identified. Furthermore, the present invention preferably uses NPV detectors that operate one symbol at a time, however, the invention may also use detectors operating on blocks of symbols. Other noise predictive detectors could also be utilized in the invention including those of the prior art. In the embodiments described below, the noise predictive filters are obtained using minimum noise variance criterion, however, other criteria such as least mean square or maximum signal to noise ratio criteria could be used to select the NPV noise filter. We note that if the noise predictive filter taps, $\alpha_0, \alpha_1, \alpha_2, \ldots, \alpha_L$, are set to 1, 0, 0, . . . ,0, respectively, then the NPV detector reduces to a Viterbi detector.

Finally, the output of the detector 18 is provided on line 28 to the input of a decoder 19. The decoder 19 also performs the inverse of the partial response filter—whenever possible—followed by the inverse of the encoder 12 in order to reproduce the input signal. The output of the decoder is provided on line 29 as an output signal. Those skilled in the art will realize that performing the inverse of the partial response filter may alternatively be done inside the detector 18 or even between the detector 18 and the decoder 19. The decoder 19 need only be used for unencoding/decoding the sequence output by the detector 18.

The present invention is particularly advantageous over the prior art because it uses a new metric, d', to measure error events. More specifically, the present invention selects the encoder 12 and the detector 18 properties such that error events having a distance d' less than a predetermined threshold are eliminated. In the first and second exemplary embodiments described below, the predetermined threshold is the square root of 1.46. In other words, the encoder 12 and the detector 18 properties are set such that all error events having a squared distance d' less than 1.46 are eliminated. In the third embodiment described below, the predetermined threshold is the square root of 2.279. This new metric, distance d', can best be understood from the following analysis.

An error event $\Omega$, belonging to a labeled trellis H, is a pair of state sequences (s,s') which for a pair of integers $k_1$ and $k_2$, $k_1 < k_2 - 1$, satisfy $$s_k = s'_k \text{ for } k \leq k_1 \text{ and } k \geq k_2,$$

and $$s_k \neq s'_k \text{ for } k_1 + 1 \leq k \leq k_2 - 1.$$

Let label sequences $y=(\ldots, y_{k_1-1}, y_{k_1}, \ldots, y_{k_2-1}, y_{k_2}, \ldots)$ and $y'=(\ldots, y'_{k_1-1}, y'_{k_1}, \ldots, y'_{k_2-1}, y'_{k_2}, \ldots)$ correspond to the state sequence s and s', respectively, where $y_i$ is the label on the edge from $s_i$ to $s_{i+1}$, and $y'_i$ is the label on the edge from $s'_i$ to $s'_{i+1}$. We define the error sequence $e(\Omega)$ corresponding to the error event $\Omega$ as $e(\Omega)=(e_{k_1},e_{k_1+1},\ldots,e_{k_2-1})=((y_{k_1}-y'_{k_1}),(y_{k_1+1}y'_{k_1+1}),\ldots,(y_{k_2-1}-y'_{k_2-1}))$. The length of the error event, $\Omega$, is defined as $\text{length}(\Omega)=k_2-k_1$. The error event probability of the detector 18, assuming a noise predictive digital filter based on a minimum variance criterion, is well approximated at moderate to high signal to noise ratios by the following novel expression, $$Pr(\text{event}) \approx N_H Q(d'_{free}/2\sigma'),$$

where Q is the complementary error function $$Q(x) = \frac{1}{\sqrt{2\pi}} \int_x^\infty e^{-y^2/2} \, dy,$$

$\sigma'^2$ is the variance of the noise obtained by passing the channel noise through the low pass filter 38, the equalizer 42, and the one of the noise predictive filters 52a, 52b, . . . , 52n of the detector 18, and distance $d'_{free}$ is defined as follows:

Given an error event $\Omega$ and noise predictive filter taps $\alpha = [o_0, c_1, \ldots, c_L]$, we define $e'(\Omega, \alpha) = (e'_0, e'_1, \ldots, e'_{k_2-k_1+L-1})$, where $$e'_j = \sum_{k=0}^{j} \alpha_k (y_{k_1+j-k} - y'_{k_1+j-k})$$

$0 \leq j \leq \min\{L - 1, k_2 - k_1 - 2\},$ $$e'_j = \sum_{k=0}^{\min\{L, k_2 - k_1\}} \alpha_k (y_{k_1+j-k} - y'_{k_1+j-k})$$

$\min\{L, k_2 - k_1 - 1\} \leq j \leq \max\{L, k_2 - k_1 - 1\},$ $$e'_j = \sum_{k=j-\min\{L, k_2-k_1\}+1}^{\min\{L, k_2-k_1\}} \alpha_k (y_{k_1+j-k} - y'_{k_1+j-k})$$

$\max\{L + 1, k_2 - k_1\} \leq j \leq k_2 - k_1 + L - 1.$

Next we let $$d'^2(\Omega) = \sum_{j=0}^{k_2-k_1-1} (e'_j)^2,$$

and define $$d'_{free} = \min_\Omega d'(\Omega).$$

Finally, $N_H$ is the "average" number of error events, $\Omega$, in H with $d'(\Omega) = d'_{free}$. If the detector trellis H supports sequences that are not valid equalizer output sequences, then at least one sequence in $\Omega$, in the definitions of $d'_{free}$ and $N_H$, must be a valid equalizer output sequence. Therefore, by reducing the number of valid equalizer output sequences using encoding and a detector with error events of distance $d'$ less than a preselected distance eliminated, the distance between error events can be increased. In each of the preferred embodiments, the present invention provides the encoder 12 and a corresponding combined encoder parity and partial response trellis in the detector 18 such as to preclude error events with small distance $d'$, thus improving the error event probability of the system 10.

Figure 4:
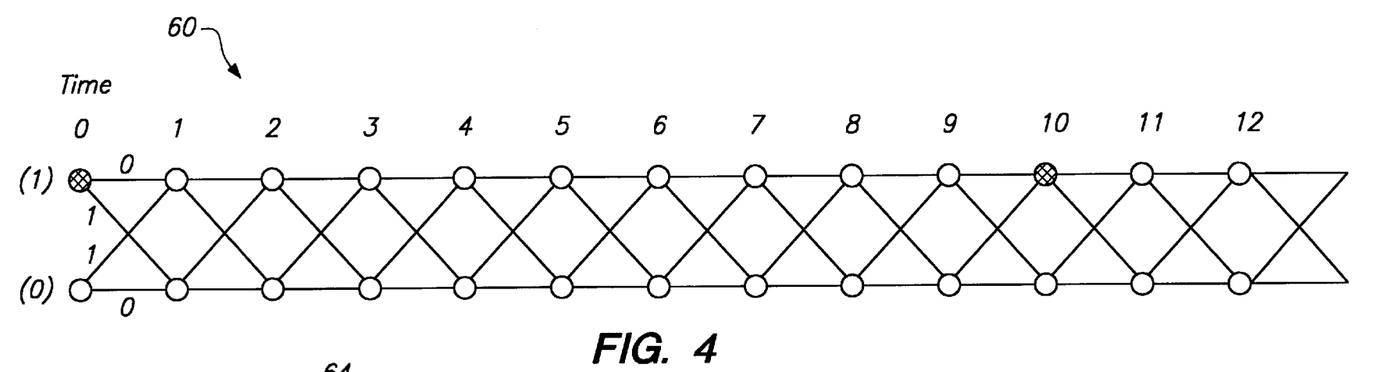
FIG. 4 is a first embodiment of an encoder parity trellis corresponding to p=1 and q=10.
Figure 5:
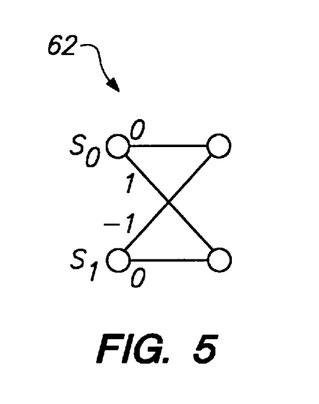
FIG. 5 is an embodiment for a 1–D partial response trellis.
Figure 6:
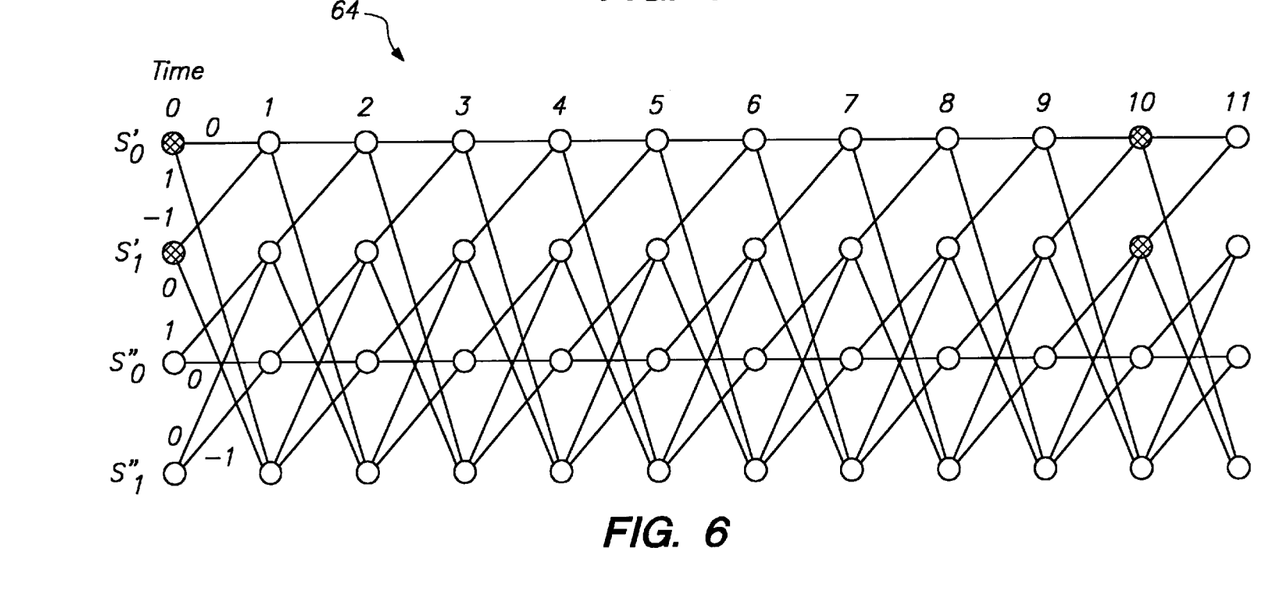
FIG. 6 is a first embodiment of a combined encoder parity and partial response trellis based on the 1–D partial response trellis for a noise predictive Viterbi detector.

Referring now to FIGS. 4–6 a first and preferred embodiment of the system 10 of the present invention will be described. In the first embodiment of the system 10, the partial response channel 16 is equalized to $(1-D)$. Therefore the relationship between the binary code sequence, $x = (x_0, x_1, x_2, \ldots)$, output by the encoder 12 and the equalized output sequence, $y = (y_0, y_1, y_2, \ldots)$, in terms of the D-transform, becomes, $y(D) = (1-D)x(D)$, where $x(D) = x_0 + Dx_1 + D^2 x_2 + \ldots$ $y(d) = y_0 + Dy_1 + D^2 y_2 + \ldots$ As noted above, the detector 18 is a noise prediemive Viterbi detector and in the first embodiment of the system 10 has taps $\alpha = [\alpha_0, o_1, o_2, c_3] = [1., 1.481, 0.941, 0.311]$. Table 1 lists $e(\Omega)$ for all $(1-D)$ error events, $\Omega$, with $d'(\Omega) < 1.7$.

TABLE 1

| $e(\Omega)$ | $(d'(\Omega))^2$ |
|---|---|
| ±(1,−1) | 1.23 |
| ±(1,−2,2,−1) | 1.42 |
| ±(1,−1,1,−1) | 1.46 |
| ±(1,−1,1,−1,1,−1) | 1.51 |
| ±(1,−1,1,−1,1,−1,1,−1) | 1.55 |
| ±(1,−1,0,1,−1) | 1.68 |

The present invention advantageously selects the encoding scheme such that $d'_{free}$ is increased. More particularly, the encoder 12 prevents the occurrence of the error events having $e(\Omega) = \pm(1,-1)$. The $1-D$ error events, $\Omega$, with $e(\Omega) = \pm(1,-1)$ are precluded if any only if no two code sequences $x = (x_0, x_1, x_2, \ldots)$ and $x' = (x'_0, x'_1, x'_2, \ldots)$ satisfy $x(D) - x'(D) = D^k$, for any integer k. In the first embodiment of the system 10, a rate 9/10 code with Hamming distance greater than 1 is preferably used in the encoder 12 to preclude these error events. More specifically, an even weight code having one parity bit is used. While in this and the other embodiments, the present invention will identify specific code rates, those skilled in the art will realize that these code rates have been chosen arbitrarily and that the invention clearly can be applied to other code rates less than one. The encoder 12 uses the code $E: (b_0, b_1, b_2, b_3, b_4, b_5, b_6, b_7, b_8) \rightarrow (x_0, x_1, x_2, x_3, x_4, x_5, x_6, x_7, x_8, x_9)$ where $$x_i = \begin{cases} b_i & 0 \leq i \leq 8, \\ b_0 \oplus b_1 \oplus \ldots \oplus b_8 & i = 9. \end{cases}$$

($\oplus$ denotes modulo 2 addition.) The coordinate $x_9$ is a parity bit which generates a Hamming distance 2. The code has even weight since $x_0 \oplus x_1 \oplus x_2 \ldots \oplus x_9 = 0$.

Given the above coding for the encoder 12, its parity trellis is defined as having $2^p$ states. Each state is denoted by a p-block, $(i_1, i_2, \ldots, i_p)$, $i_j \in \{0,1\}$; and there is an edge from $(i_1, i_2, \ldots, i_p)$ to $(j_1, j_2, \ldots, j_p)$ labeled x if $(j_1, j_2, \ldots, j_p) = (i_2, \ldots, i_p, i_1 \oplus x)$. In addition, states denoted by $(1, i_2, \ldots, i_p)$ are erased from the trellis every time k such that $k = 0, 1, \ldots, p-1 \mod(p \times q)$. In the first embodiment of the system 10, $p = 1$ and $q = 10$, and FIG. 4 shows an encoder parity trellis 60 for the case $p = 1$ and $q = 10$. Dark circles denote eliminated states.

A conventional $1-D$ partial response trellis 62 is shown in FIG. 5. The $1-D$ partial response trellis 62 has two states $s_0$ and $s_1$, corresponding to a '0' and a '1' input to the channel, respectively.

The first embodiment of the present invention advantageously uses a first embodiment of a combined encoder parity and $1-D$ partial response trellis 64 in the noise predictive Viterbi detector 18. A first embodiment for the combined encoder parity and $1-D$ partial response trellis 64 is shown in FIG. 6. The combined encoder parity and $1-D$ partial response trellis 64 is adapted from the $1-D$ partial response trellis 62, in order to accommodate the parity structure of the code. The combined encoder parity and $1-D$ partial response trellis 64 has four states $s'_1, s'_0, s''_1$, and $s''_0$. However, every 10 symbols, the states $s_0'$ and $s_1'$ are eliminated. This produces a time varying trellis. The states of the detector 18 are preferably disabled at a particular time by assigning a large value to the states' metric. The eliminated states are denoted by dark circles in FIG. 6. The states of the combined trellis 64 have the following interpretation. If a path ends on states $s'_1$ or $s'_0$ at a time k, then there are an odd number of ones input to the channel since time k−k(mod10). On the other hand, if a path ends on states $s''_1$ or $s''_0$ at a time k, then there are an even number of ones input to the channel since time k−k(mod10). This embodiment of the system is advantageous because a significant increase in the coding gain is achieved by using a particular encoding scheme and adapting the detector 18 to the encoding scheme. The present invention does not require the combined encoder trellis and the partial response trellis be the same as the detector trellis. It suffices that the detector utilize a combined trellis of the partial response trellis and a trellis TT, where TT supports all valid code sequences, and TT does not support any distance, d', error events that are excluded from the code sequences by the encoder, but otherwise TT could support sequences which are not valid code sequences. This reduces the amount of hardware required since, in general, the encoder trellis can be more complex than a suitably chosen TT. In the first three embodiments, TT happens to be the same as the encoder trellis, but in the forth embodiment, TT has less hardware complexity than the encoder trellis.

Since the combined trellis is based upon the encoder parity trellis and the partial response trellis, those skilled in the art will also realize that a convolutional code may be used in encoder 12 if its code sequences belongs to an encoder parity trellis, for some p and q. In such a case, the combined trellis will be based on the encoder parity trellis which supports the convolutional code sequences and the partial response trellis.

Figure 7:
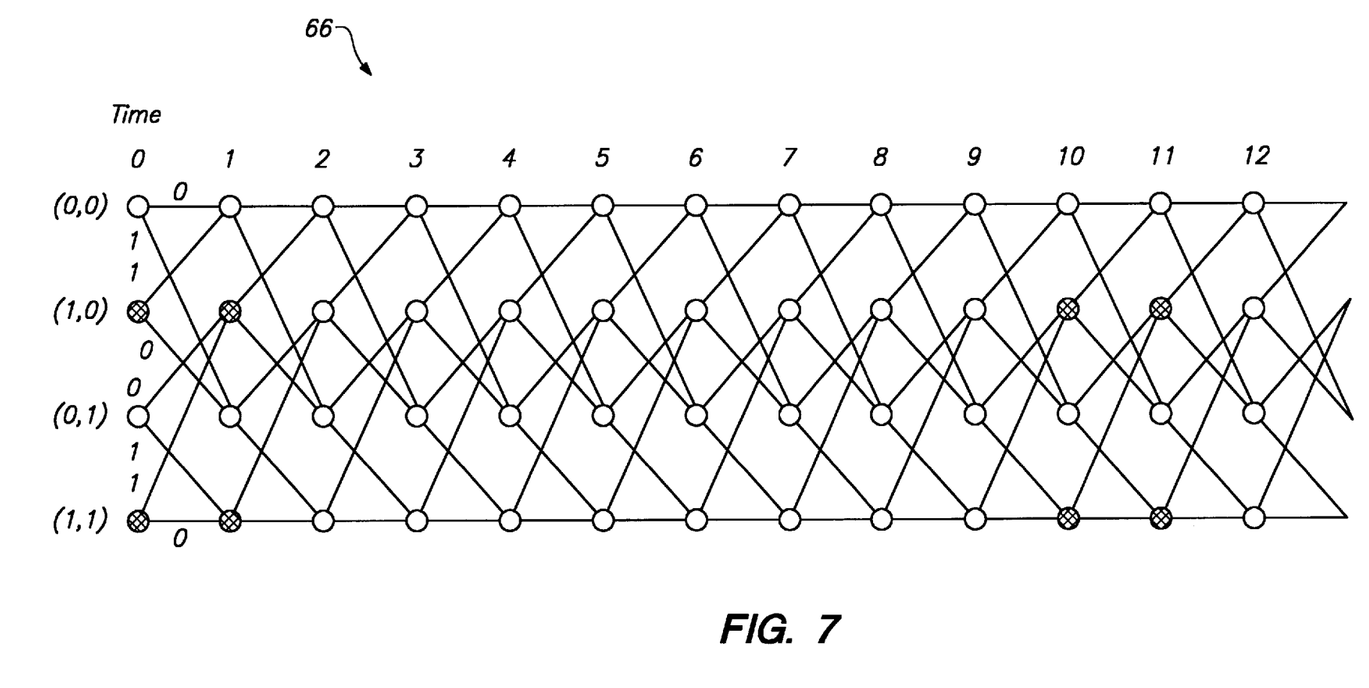
FIG. 7 is a second embodiment of the encoder parity trellis corresponding to p=2 and q=5.
Figure 8:
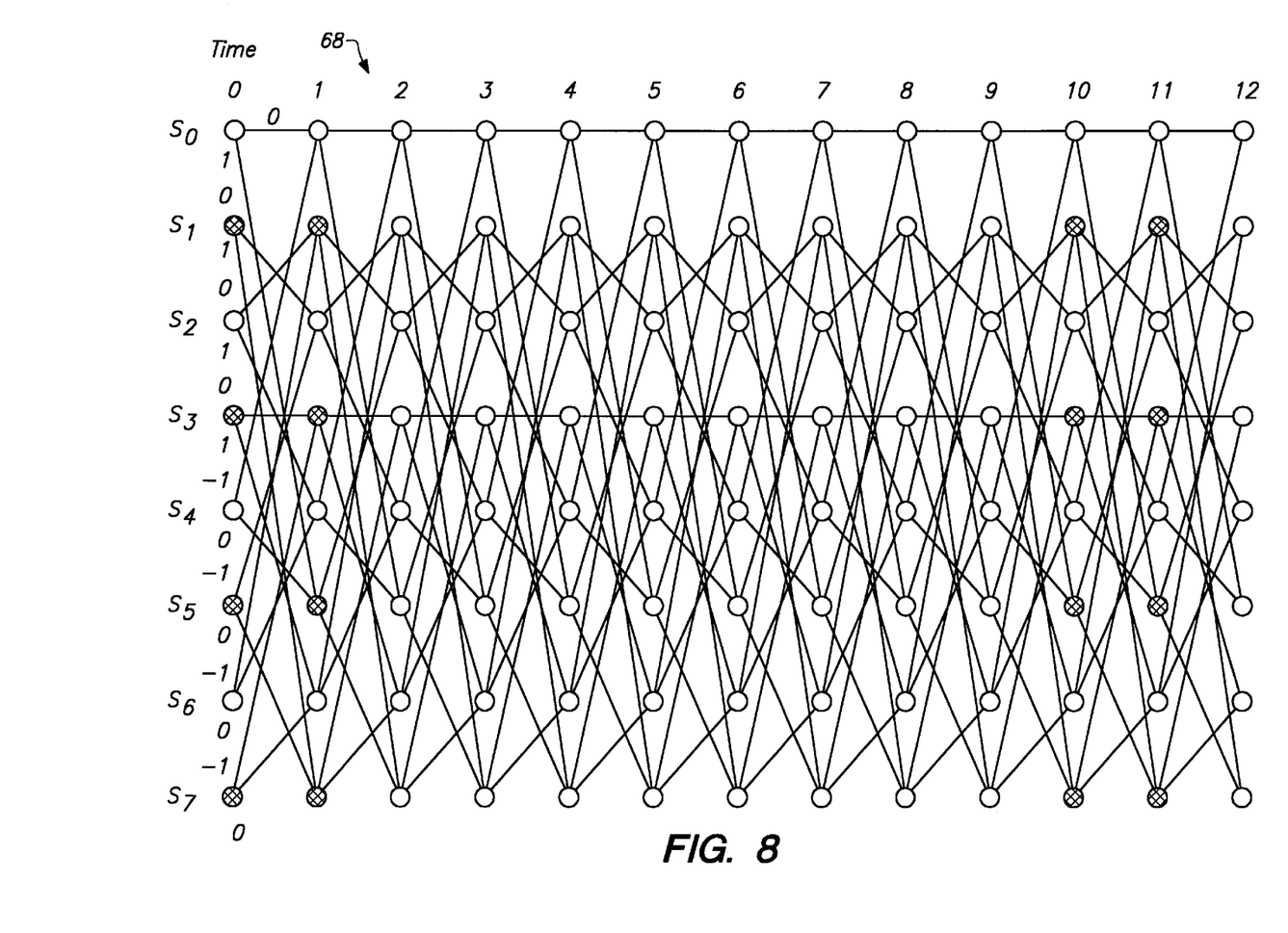
FIG. 8 is a second embodiment of a combined encoder parity and partial response trellis based on the 1–D partial response trellis for the noise predictive Viterbi detector.

Referring now to FIGS. 5, 7 and 8, a second embodiment of the system 10 will be described. The second embodiment of the system 10 is very similar to the first embodiment except that the encoder 12 has a different encoding scheme, thus in accordance with the teachings of the present invention, a unique parity trellis and a unique combined parity and partial response trellis are needed. The second embodiment of the system 10 is the same as the first embodiment in that: the partial response channel 16 is equalized to (1−D); the detector 18 is a noise predictive Viterbi detector and has taps $\alpha=[\alpha_0,\alpha_1,o_2,c_3]=[1., 1.481, 0.941, 0.311]$; and the encoder 12, or the encoding scheme used, precludes the occurrence of the error events $\underline{e}(\Omega)=+(1,-1)$.

The second embodiment of the system 10, however, has an entirely different encoding scheme. The encoder 12 in the second embodiment has the following map:

$$E:(b_0,b_1,b_2,b_3,b_4,b_5,b_6,b_7) \to (x_0,x_1,x_2,x_3,x_4,x_5,x_6,x_7,x_8,x_9),$$

where $$x_i = \begin{cases} b_i & 0 \leq i \leq 7, \\ \sum_{k \in \{1,3,5,7\}} b_k & i = 8, \\ \sum_{k \in \{0,2,4,6\}} b_k & i = 9. \end{cases}$$

an the summations of the above equations are modulo 2 addition. The coordinate $x_8$ is a parity bit on the odd indexed bits, and the coordinate $x_9$ is a parity bit on the even indexed bits. Thus, the encoder 12 can be viewed as de-interleaving input string into two strings, and encoding each de-interleaved string with an even weight code, and then interleaving of the coded de-interleaved strings. The encoder has an 8/10 rate and a Hamming distance 2, and precludes the occurrence of the error events having $\underline{e}(\Omega)=\pm(1,-1)$.

Referring now to FIG. 7, a diagram of a second embodiment of the encoder parity trellis 66 is shown. The second embodiment of the encoder parity trellis 66 is defined like the first embodiment 60 as having $2^p$ states; each state denoted by a p-block, $(i_1, i_2, \ldots, i^p)$, $i_j \in \{0,1\}$; there is an edge from $(i_1, i_2, \ldots, i_p)$ to $j_1, j_2, \ldots, j_p)$ labeled x if $(j_1, j_2, \ldots, j_p)=(i_2, \ldots i_p, i_1 \oplus x)$, and states denoted by $(1, i_2, \ldots, i_p)$ are erased from the trellis every time k such that k=0, 1, ..., p−1 mod(p×q). In the second embodiment of the encoder parity trellis 66, p=2 and q=5. Dark circles denote eliminated states.

The 1−D partial response trellis 62, shown in FIG. 5, is again used as a basis for the combined trellis in the second embodiment of the system 10.

The second embodiment of the system 10, according to the present invention, uses a second embodiment of the combined encoder parity and 1−D partial response trellis 68 in the detector 18. FIG. 8 is a diagram of the second embodiment of the combined encoder parity and 1−D partial response trellis 68. The second combined trellis 68 has eight states $s_i$, $0 \leq i \leq 7$. However, at every time k, k=0 mod(10) and k=1 mod(10), the states $s_1$, $s_3$, $s_5$, and $s_7$ are eliminated to exclude sequences not allowed by the encoder 12. The eliminated states are denoted by dark circles in FIG. 8. The states of the second combined trellis 68 have the following interpretation. Fix a state $s_i$, $0 \leq i \leq 7$, and let $u_1 u_2 u_3$ be the binary representation of the integer i. Now any sequence input to the channel 16 that forces the trellis 68 into state $s_i$ at a time k has the following three properties. First, the last bit in the sequence is $u_1$. Second, $N_1(k)+u_2=0$ mod 2, where $N_1(k)$ denotes the number of ones in the input sequence at times $k' \leq k$, such that k'+k=1 mod 2. And Finally, $N_2(k)+u_3=0$ mod 2, where $N_2(k)$ denotes the number of ones in the input sequence at times $k' \leq k$, such that k'+k=0 mod 2.

Figure 9:
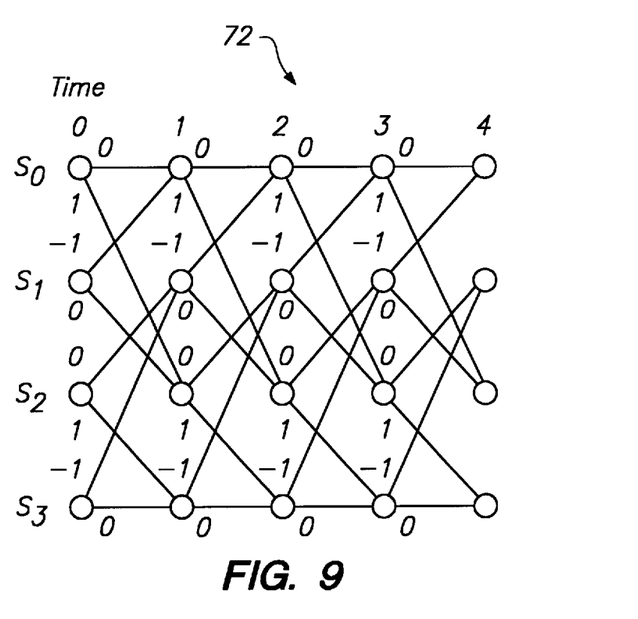
FIG. 9 is an embodiment of a (1–D)(1+D) partial response trellis.
Figure 10:
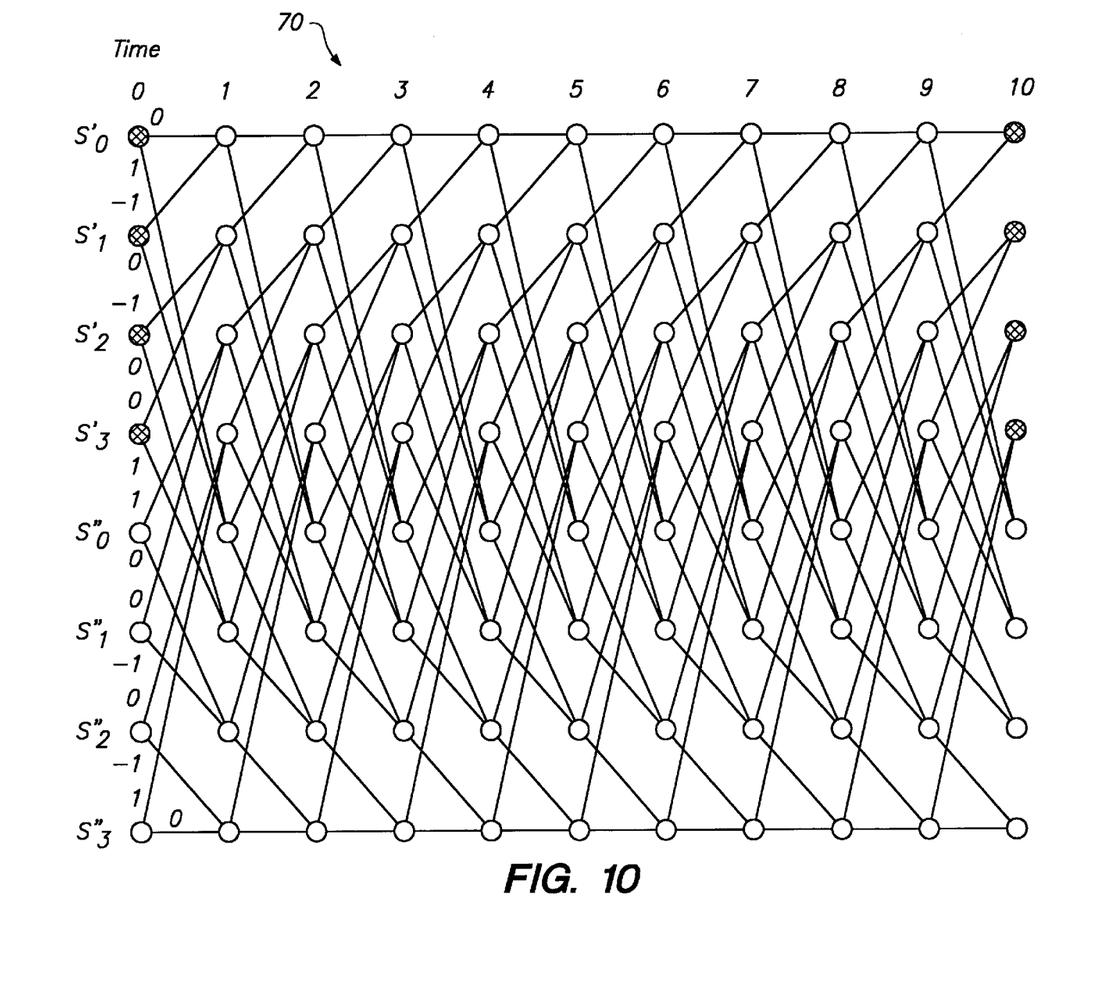
FIG. 10 is a third embodiment of the combined encoder parity and partial response trellis based upon the (1–D)(1+D) partial response trellis.

Referring now to FIGS. 4, 9 and 10. a third embodiment of the system 10 of the present invention will be described. In the third embodiment of the system 10, the partial response channel 16 is equalized to (1−D)(1+D). Therefore, the relationship between the binary code sequence, $x=(x_0, x_1, x_2, \ldots)$, output by the encoder 12 and the equalized output sequence, $y=(y_0, y_1, y_2, \ldots)$, in terms of the D-transform, is $y(D)=(1-D)(1+D)x(D)=(1-D^2)x(D)$. Further, we assume detector 18 is a noise predictive Viterbi detector with taps $\alpha=[\alpha_0,o_1,o_2,c_3]=[1., 0.668, 0.501, 0.105]$. Table 2 lists $e(\Omega)$ for all (1−D)(1+D) error events, $\Omega$, with $d'(\Omega)<2.5$. Therefore, $(d'_{free})^2=1.694$.

TABLE 2

| $e(\Omega)$ | $(d'(\Omega))^2$ |
|---|---|
| ±(1,−1,0,1,−1) | 1.694 |
| ±(1,0,−1) | 1.695 |
| ±(1,0,−1,1,0,−1) | 2.279 |
| ±(1,−1,0,0,0,1,−1) | 2.416 |
| ±(1,−1,0,0,0,0,−1,1) | 2.416 |
| ±(1,−1,0,0,0,0,0,1,−1) | 2.416 |
| ±(1,−1,0,0,0,0,0,0,−1,1) | 2.416 |
| ±(1,−1,−1,1) | 2.476 |

Again, the present invention advantageously selects the encoding scheme such that $d'_{free}$ is increased. Specifically in this embodiment, the encoder 12 eliminates the error events having $e(\Omega)=\pm(1,−1,0,1,−1)$ and $\pm(1,0,−1)$. The (1−D)(1+D) error events, $\Omega$, with $e(\Omega)=\pm(1,−1,0,1,−1)$ and $\pm(1,0,−1)$ are precluded if and only if no two code sequences $x=(x_0, x_1, x_2, \ldots)$ and $x'=(x'_0, x'_1, x'_2, \ldots)$ satisfy $x(D)-x'(D)=D^k$, or $x(D)-x'(D)=D^k-D^{k+1}+D^{k+2}$, for any integer k. This condition is satisfied using the same encoding scheme as in the first embodiment of the system. A rate 9/10, even weight code is preferably used in the encoder 12 to preclude these error events. Thus, the encoder map is $E:(b_0,b_1,b_2,b_3,b_4,b_5, b_6,b_7,b_8) \rightarrow (x_0,x_1,x_2,x_3,x_4,x_5,x_6,x_7,x_8,x_9)$, where $$x_i = \begin{cases} b_i & 0 \leq i \leq 8, \\ \sum_{k=0}^{8} b_k & i = 9. \end{cases}$$

and the summations of the above equations are modulo 2 addition.

The encoder parity trellis 60 is the same as the one as in the first embodiment of system 10 and is shown in FIG. 4.

Referring now to FIG. 9, a diagram of a (1−D)(1+D) partial response trellis 72 is shown. The (1−D)(1+D) partial response trellis 72 has four states, $s_0$, $s_1$, $s_2$, and $s_3$. If the last two bits input to the channel are 00, 01, 10, and 11, then (1−D)(1+D) partial response trellis 72 is in state $s_0$, $s_1$, $s_2$, and $s_3$, respectively.

Referring now to FIG. 10, a third embodiment of a combined encoder parity and (1−D)(1+D) partial response trellis 70 is shown. The combined trellis 70 has eight states, $s'_0$, $s'_1$, $s'_2$, $s'_3$, $s''_0$, $s''_1$, $s''_2$, and $s''_3$. However, every 10 symbols the states $s'_0$, $s'_1$, $s'_2$, and $s'_3$ are eliminated. The states of the combined trellis 70 have a similar interpretation as the states in the first embodiment of the system 10. If a path ends on states $s'_0$, $s'_1$, $s'_2$, and $s'_3$ at a time k, then there are an odd number of ones input to the channel since time k−k(mod 10). On the other hand, if a path ends on states $s''_0$, $s''_1$, $s''_2$, and $s''_3$ at a time k, then there are an even number of ones input to the channel since time k−k(mod 10).

Referring now to FIGS. 4, 9 and 10, a fourth and final embodiment of the system 10 of the present invention will be described. The fourth embodiment of the system 10 is similar to the third embodiment, except it uses a different encoding scheme. The fourth embodiment of the system 10 is the same as the third embodiment in that: the partial response channel 16 is equalized to (1−D)(1+D); the detector 18 is a noise predictive Viterbi detector and has taps $\alpha=[\alpha_0,\alpha_1,o_2,c_3]=[1., 0.668, 0.501, 0.105]$; and the encoder 12, or the encoding scheme used, precludes the occurrence of the error events having $e(\Omega)=\pm(1,-1,0,1,-1)$ and $\pm(1,0,-1)$.

The third embodiment of the encoder 12 does not employ any of the following four sequences at its output: 1) . . . 1111 . . . (all one sequence); 2) . . . 0000 . . . (all zero sequence); 3) . . . 1010 . . . (all 10 sequence); and 4) . . . 0101 . . . (all 01 sequence). These sequences are processed into an all zero sequences once they pass through a (1−D)(1+D) partial response channel filter. Therefore, the partial response channel 16 does not have a unique inverse for the all zero sequence if the above four sequences are allowed to be input to the partial response channel 16. Therefore, it is desirable to eliminate these sequences. The third embodiment for the encoder 12 maps $E; (b_0,b_1,b_2,b_3,b_4,b_5,b_6,b_7,b_8) \rightarrow (x_0,x_1,x_2,x_3,x_4,x_5,x_6,x_7,x_8,x_9)$, where $(x_0,x_1, \ldots ,x_8) =$ $$\begin{cases} (1,1,0,0,1,1,0,0,1), & \text{for } (b_0, \ldots ,b_7) = (0,0,0,0,0,0,0,0), \\ (0,0,1,1,0,0,1,1,1), & \text{for } (b_0, \ldots ,b_7) = (1,1,1,1,1,1,1,1), \\ (1,1,0,0,0,0,1,1,1), & \text{for } (b_0, \ldots ,b_7) = (1,0,1,0,1,0,1,0), \\ (0,0,1,1,1,1,0,0,1), & \text{for } (b_0, \ldots ,b_7) = (0,1,0,1,0,1,0,1), \\ (b_0,b_1, \ldots ,b_7,0), & \text{otherwise,} \end{cases}$$

$$x_9 = \sum_{k=0}^{8} x_k.$$

and the summations of the above equations are modulo 2 addition. Thus, the encoder is using a rate 8/10, code with Hamming distance equal to 2 to produce code sequences. The encoder parity trellis and the partial response trellis for this fourth embodiment are the same as in the third embodiment, therefore, the combined trellis is the same as well. However, it should be noted that the encoder parity trellis of the fourth embodiment is not the same as its encoder trellis because it supports sequences not in the code.

Figure 11:
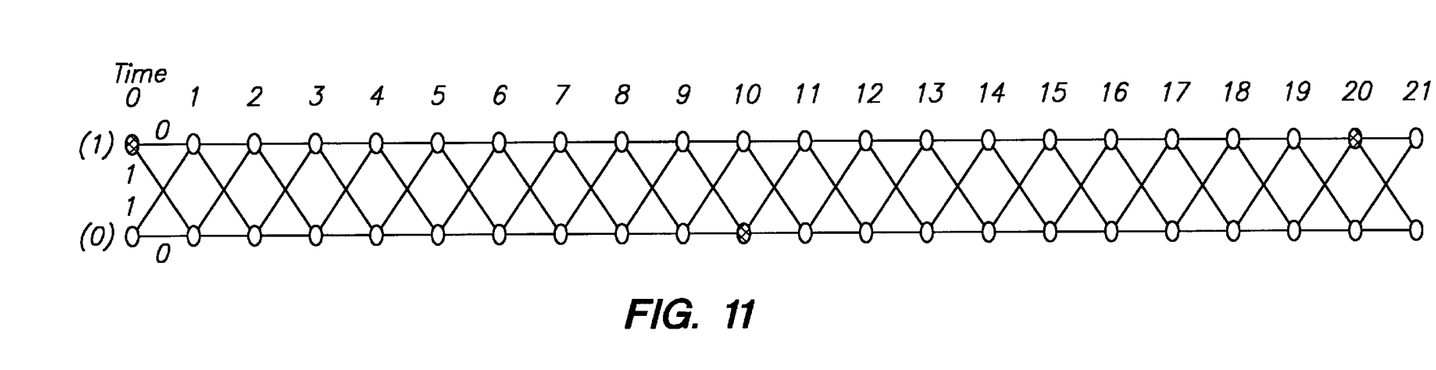
FIG. 11 is a third embodiment of the encoder parity trellis having an odd weight code in the encoder.
Figure 12:
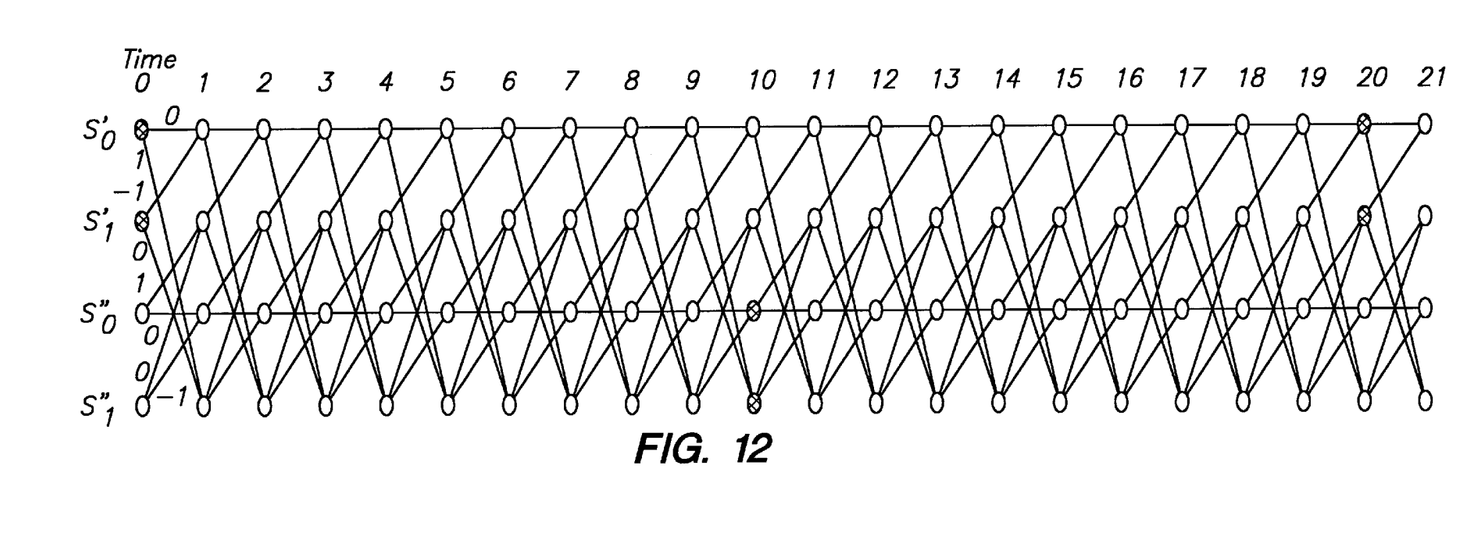
FIG. 12 is a forth embodiment of the combined encoder parity and partial response trellis based on the (1–D)(1+D) partial response trellis.

While the present invention has been described above with reference to specific preferred embodiments, the description is illustrative of the invention and is not to be construed as limiting the invention. Various modification to the present invention can be made to the preferred embodiments by those skilled in the art without departing from the true spirit and scope of the invention as defined by the appended claims. For example, instead of an even weight code, an odd weight code with Hamming distance at least 2 can be used by the encoder 12 without effecting the gains. An odd weight code with Hamming distance 2 may be obtained by beginning with an even weight code and then complement one bit, for example, the last bit of each code word. However, the combined encoder parity and partial response trellis should be modified accordingly for an odd weight code. The changes in the trellis are straightforward, and they double the period of the trellis. For example, if the encoder map of the first embodiment is changed according to $E:(b_0,b_1,b_2,b_3,b_4,b_5,b_6,b_7,b_8) \rightarrow (x_0,x_1,x_2,x_3,x_4,x_5,x_6,x_8,\overline{x_9})$, where the over bar denotes complementation, and $$x_i = \begin{cases} b_i & 0 \leq i \leq 8, \\ b_0 \oplus b_1 \oplus \ldots \oplus b_8 & i = 9. \end{cases}$$

then, the new encoder parity trellis and the combined trellis are shown in FIG. 11 and FIG. 12, respectively. One reason for using an odd weight code is to ensure that the all zero sequence does not appear as a code sequence.

What is claimed is:

1. An apparatus for coding an input signal to provide coding gain, said apparatus comprising:

an encoder having an input and an output for generating a code sequence from the input signal using an encoding scheme, the input of the encoder coupled to receive the input signal;

a partial response channel having an input and an output for transforming signals to provide an equalized code sequence, the input of the partial response channel coupled to the output of the encoder for receiving the code sequence; and a detector having an input and an output for producing an output sequence, the input of the detector coupled to the output of the partial response channel to receive the equalized code sequence, the detector having a trellis that precludes error events with small distances d'.

2. The apparatus of claim 1, wherein the encoder de-interleaves the input string, encodes each of the de-interleaved input strings, and interleaves the coded de-interleaved strings into the code sequence.

3. The apparatus of claim 1, wherein the encoder uses a code having a Hamming distance greater than 1 for encoding.

4. The apparatus of claim 3, wherein the encoder uses an even code weight for encoding.

5. The apparatus of claim 1, further comprising a modulator having an input and an output for generating a waveform from the code sequence, the input of the modulator coupled to the output of the encoder and the output of the modulator coupled to the input of the partial response channel.

6. The apparatus of claim 1, wherein the partial response channel further comprises:
   a first filter having an input and an output, the input of the first filter coupled to the output of the encoder to receive the code sequence;
   a noise source having an output;
   an adder having an first input, a second input and an output for combining signal, the first input of the adder coupled to the output of the first filter and the second input of the adder coupled to the output of noise source;
   a low pass filter having an input and an output, the input of the low pass filter coupled to the output of the adder; and
   an equalizer having an input and an output generating sequences, the input of the equalizer coupled to the output of the low pass filter.

7. The apparatus of claim 1, wherein the partial response channel is equalized to (1−D).

8. The apparatus of claim 1, wherein the partial response channel is equalized to (1−D)(1+D).

9. The apparatus of claim 1, wherein the detector is a noise predictive Viterbi detector having a combined encoder parity and partial response trellis.

10. The apparatus of claim 9, wherein the noise predictive Viterbi filter includes a noise predictive digital filter derived using minimum noise variance criterion.

11. A method for coding an input string for a partial response channel to provide coding gain, said method comprising:
   encoding an input string by a code with Hamming distance greater than one to generate a code sequence;
   applying the code sequence to a partial response channel to generate an equalized code sequence; and
   producing an output sequence by applying the equalized output sequence to a noise predictive Viterbi detector, the noise predictive Viterbi detector having a trellis that precludes error events with small distances d'.

12. The method of claim 11 wherein the step of encoding the input string further comprises the steps of:
   de-interleaving an input string into a plurality of de-interleaved strings;
   coding each de-interleaved string with a code with Hamming distance greater than one to produce a coded de-interleaved string; and
   interleaving the coded de-interleaved strings into the code sequence.

13. The method of claim 11 wherein, the code is an even weight code.

14. The method of claim 11 wherein, the encoding step produces the weighted code by mapping $E:(b_0,b_1,b_2,b_3,b_4,b_5,b_6,b_7,b_8) \rightarrow (x_0,x_1,x_2,x_3,x_4,x_5,x_6,x_7,x_8,x_9)$, where $$x_i = \begin{cases} b_i & 0 \leq i \leq 8, \\ \sum_{k=0}^{8} b_k & i = 9. \end{cases}$$

15. The method of claim 11 wherein, the encoding step produces the weighted code by mapping $E:(b_0,b_1,b_2,b_3,b_4,b_5,b_6,b_7) \rightarrow (x_0,x_1,x_2,x_3,x_4,x_5,x_6,x_7,x_8,x_9)$, where $$x_i = \begin{cases} b_i & 0 \leq i \leq 7, \\ \sum_{k \in \{1,3,5,7\}} b_k & i = 8, \\ \sum_{k \in \{0,2,4,6\}} b_k & i = 9. \end{cases}$$

16. The method of claim 11 wherein, the encoding step produces the code by mapping $E:(b_0,b_1,b_2,b_3,b_4,b_5,b_6,b_7,b_8) \rightarrow (x_0,x_1,x_2,x_3,x_4,x_5,x_6,x_7,x_8,x_9)$, where $(x_0,x_1,\ldots,x_8) =$ $$\begin{cases} (1,1,0,0,1,1,0,0,1), & \text{for } (b_0,\ldots,b_7) = (0,0,0,0,0,0,0,0), \\ (0,0,1,1,0,0,1,1,1), & \text{for } (b_0,\ldots,b_7) = (1,1,1,1,1,1,1,1), \\ (1,1,0,0,0,0,1,1,1), & \text{for } (b_0,\ldots,b_7) = (1,0,1,0,1,0,1,0), \\ (0,0,1,1,1,1,0,0,1), & \text{for } (b_0,\ldots,b_7) = (0,1,0,1,0,1,0,1), \\ (b_0,b_1,\ldots,b_7,0), & \text{otherwise,} \end{cases}$$

$$x_9 = \sum_{k=0}^{8} x_k.$$

17. The method of claim 11 wherein the step of applying the code sequence to a partial response channel further comprises the steps of:
   transmitting the code sequence through a channel to generate a channel output sequence;
   filtering the channel output sequence with a low pass filter; and
   equalizing the filtered channel output sequence to produce an equalized output sequence.

18. The method claim 11 wherein, the partial response channel is equalized to (1−D).

19. The method claim 11 wherein, said partial response channel is equalized to (1−D)(1+D).

20. The method of claim 11 wherein the step of producing an output sequence further comprises the step of applying the equalized output sequence to a noise predictive Viterbi detector having a combined encoder parity trellis and partial response trellis.

21. The method of claim 11 further comprising the step of applying the "inverse" of the partial response filter to the output sequence, and then decoding the resulting sequence.

* * * * *